United States Patent
Pearson

(10) Patent No.: US 8,528,026 B2
(45) Date of Patent: Sep. 3, 2013

(54) SYSTEM AND METHOD FOR PROCESSING AUDIO SIGNALS RECEIVED BY A COMMUNICATION DEVICE

(75) Inventor: Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 918 days.

(21) Appl. No.: 12/329,515

(22) Filed: Dec. 5, 2008

(65) Prior Publication Data

US 2010/0146572 A1   Jun. 10, 2010

(51) Int. Cl.
*H04N 7/18* (2006.01)

(52) U.S. Cl.
USPC .......... 725/80; 725/12; 725/81; 725/85; 725/141; 725/153; 379/102.03; 379/142.16; 700/94

(58) Field of Classification Search
None
See application file for complete search history.

(56) References Cited

U.S. PATENT DOCUMENTS

| | | | |
|---|---|---|---|
| 6,678,362 B2 * | 1/2004 | Hong et al. | 379/102.03 |
| 2002/0141599 A1 | 10/2002 | Trajkovic et al. | |
| 2003/0005462 A1 * | 1/2003 | Broadus et al. | 725/110 |
| 2004/0068744 A1 * | 4/2004 | Claussen et al. | 725/81 |
| 2005/0282582 A1 * | 12/2005 | Slotznick | 455/557 |
| 2007/0250845 A1 * | 10/2007 | Walter et al. | 725/10 |
| 2007/0256113 A1 * | 11/2007 | Esteban et al. | 725/139 |
| 2008/0134278 A1 * | 6/2008 | Al-Karmi | 725/141 |
| 2008/0196066 A1 * | 8/2008 | Matz | 725/62 |
| 2008/0219223 A1 * | 9/2008 | Bienas et al. | 370/338 |
| 2010/0058407 A1 * | 3/2010 | LaFreniere et al. | 725/106 |

* cited by examiner

*Primary Examiner* — Jason J Chung

(74) *Attorney, Agent, or Firm* — Guntin & Gust, PLC; Andrew Gust

(57) ABSTRACT

A system that incorporates teachings of the present disclosure may include, for example, a communication device having a controller to receive a media program signal from a set-top box (STB), monitor ambient sound, and suppress a portion of the ambient sound according to the media program signal. The media program signal can correspond to a media program presentable at least audibly by the STB. Other embodiments are disclosed.

7 Claims, 6 Drawing Sheets

SYSTEM AND METHOD FOR PROCESSING AUDIO SIGNALS RECEIVED BY A COMMUNICATION DEVICE

FIELD OF THE DISCLOSURE

The present disclosure relates generally to communication techniques and more specifically to a system and method for processing audio signals received by a communication device.

BACKGROUND

Sometimes ambient noise can cause individuals difficulty to engage in a telephone conversation. Noise suppression devices such headsets with noise cancellation technology can assist individuals in limiting background noise. There are a number of Bluetooth headsets today for instance that provide varying degrees of noise cancellation.

DETAILED DESCRIPTION

One embodiment of the present disclosure can entail a communication device having a controller to receive a media program signal from a set-top box (STB), monitor ambient sound, and suppress a portion of the ambient sound according to the media program signal. The media program signal can correspond to a media program presentable at least audibly by the STB.

Another embodiment of the present disclosure can entail a computer-readable storage medium having computer instructions to receive a media signal from a media processor, monitor ambient sound, and suppress a portion of the ambient sound according to the media signal.

Yet another embodiment of the present disclosure can entail a media processor having a controller to transmit to a communication device a media signal corresponding to media content presentable by the media processor which causes an undesirable source of sound for the communication device. The communication device can be adapted to suppress a portion of ambient sound received thereby according to the media signal.

Another embodiment of the present disclosure can entail suppressing at least a portion of ambient sound generated by a media device considered to be an undesirable source of sound according to a signal transmitted by the media device. The signal can describe the portion of the ambient sound generated by the media device.

Figure 1:
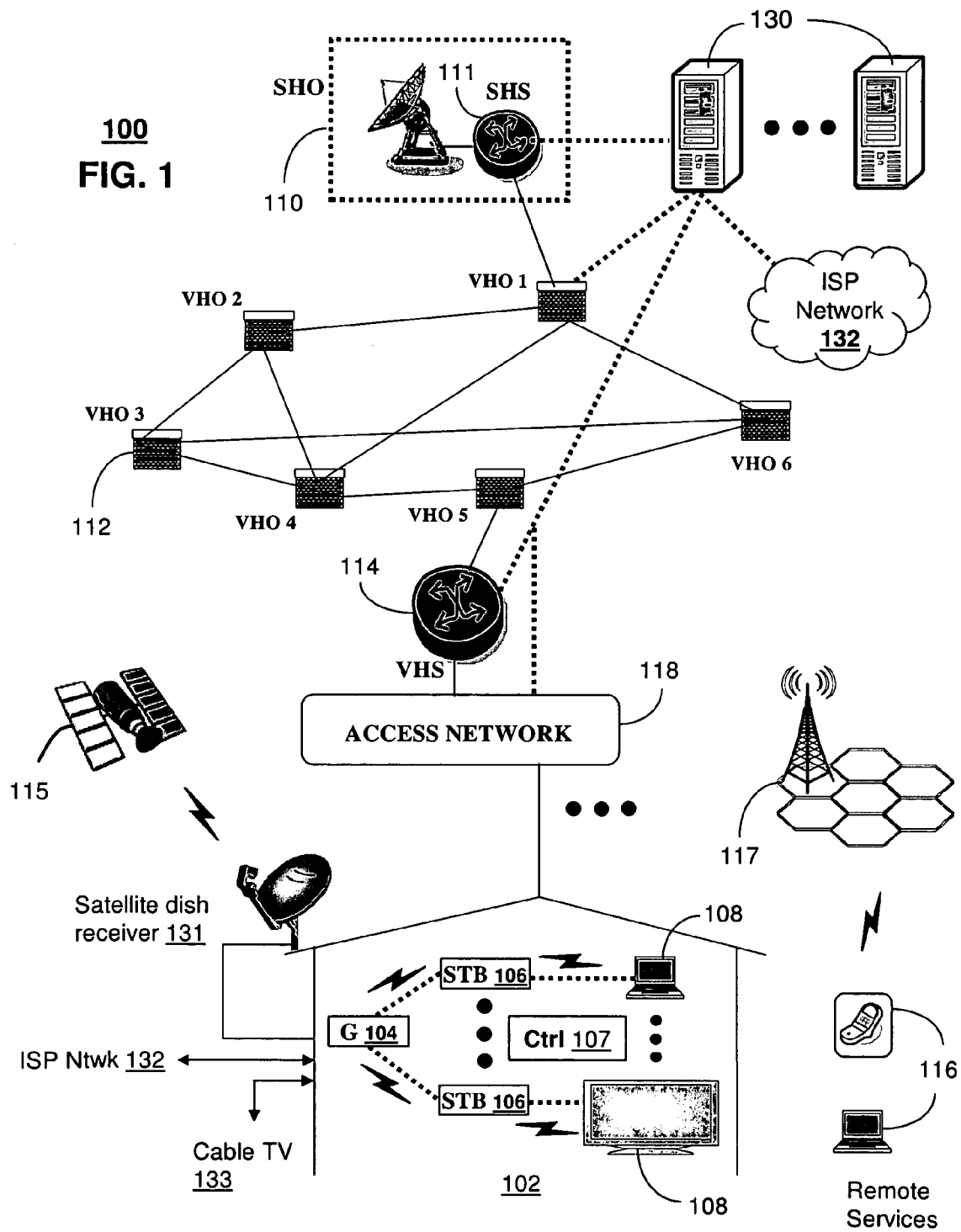
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
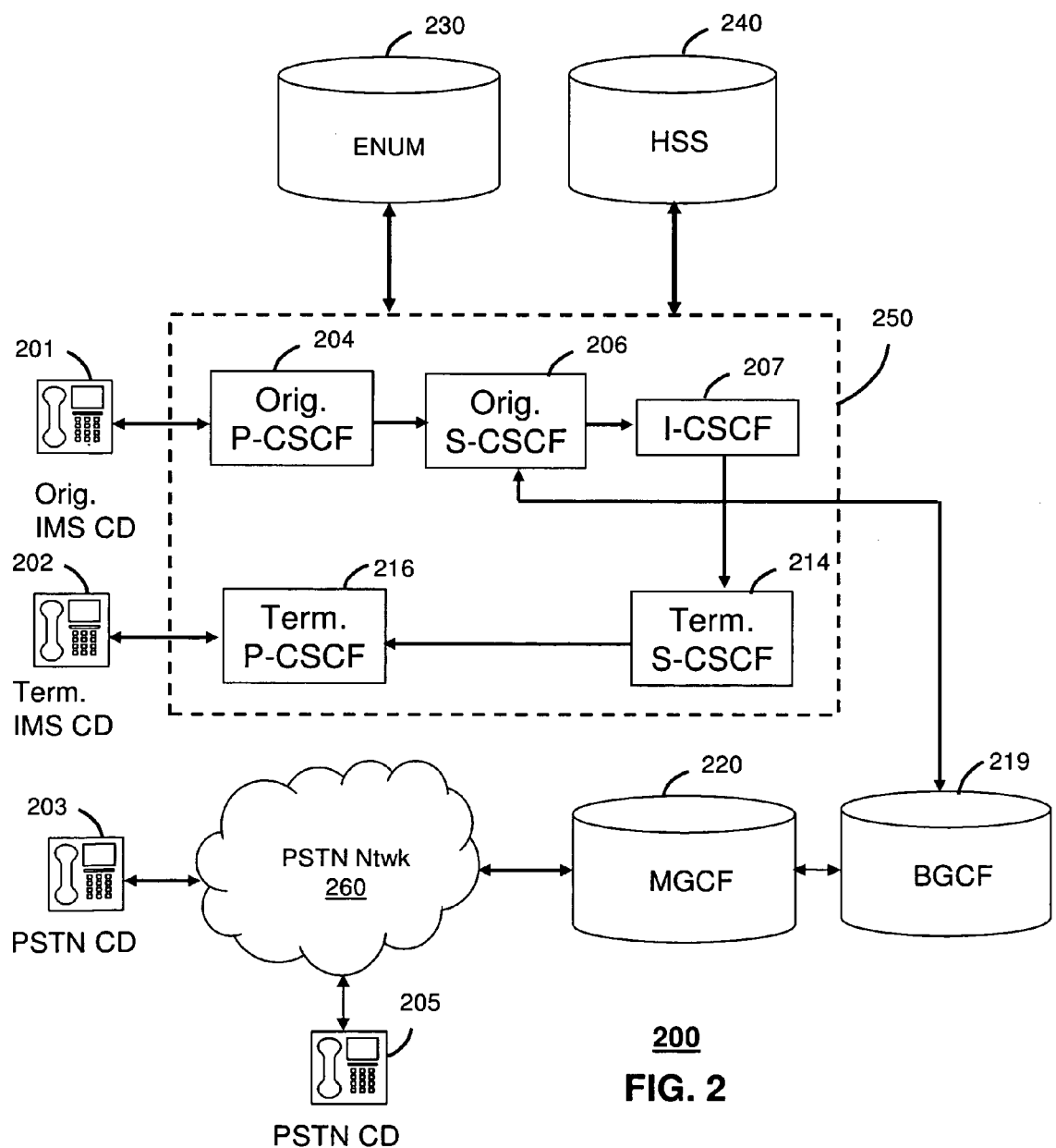

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
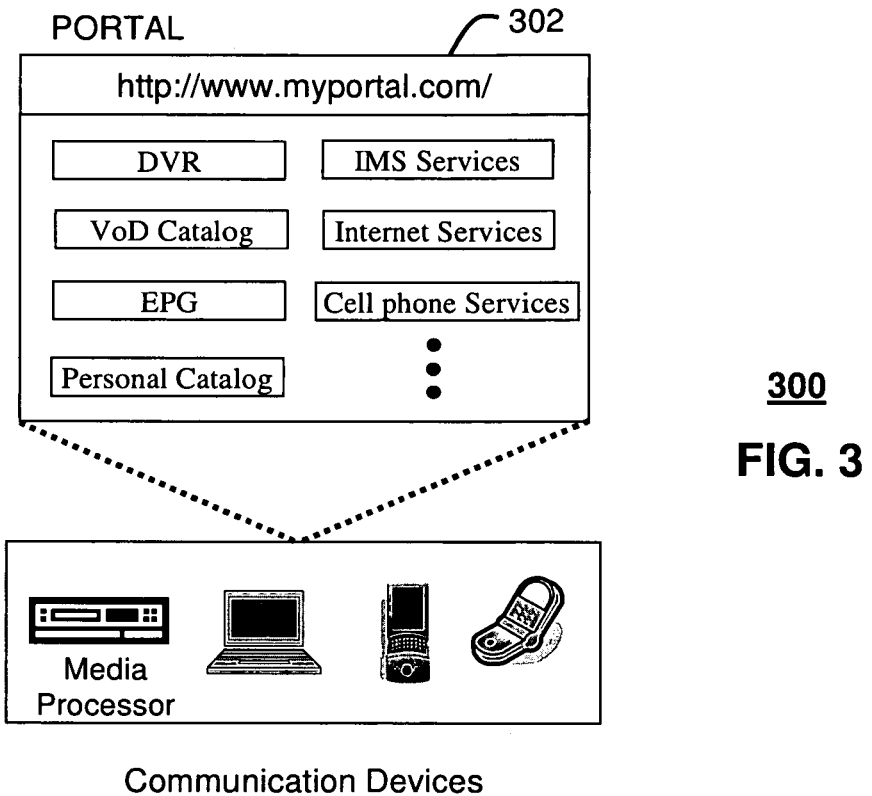
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
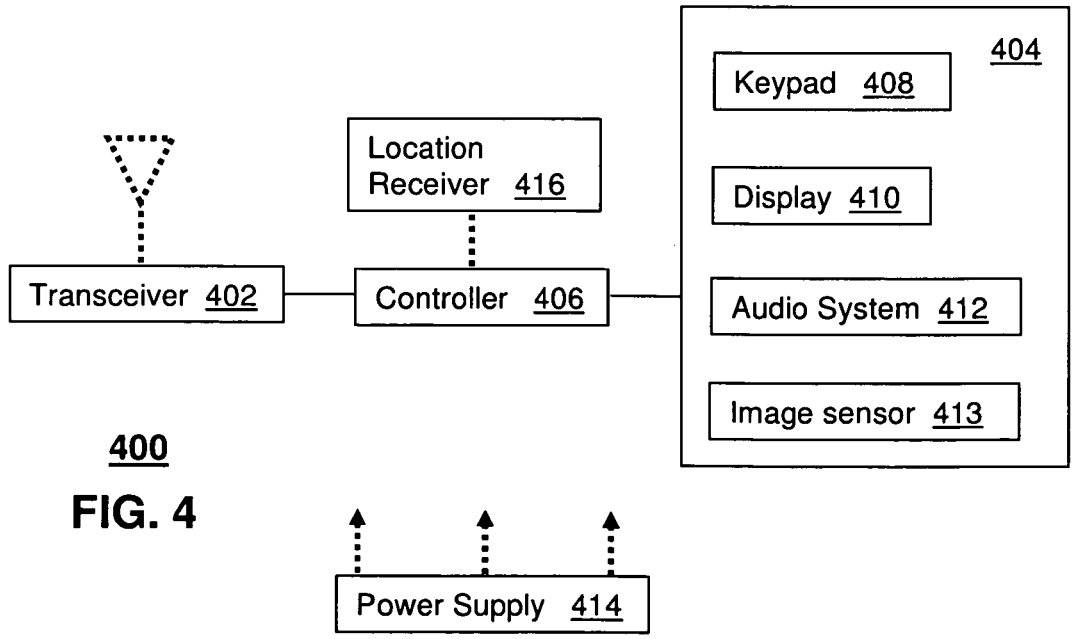
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
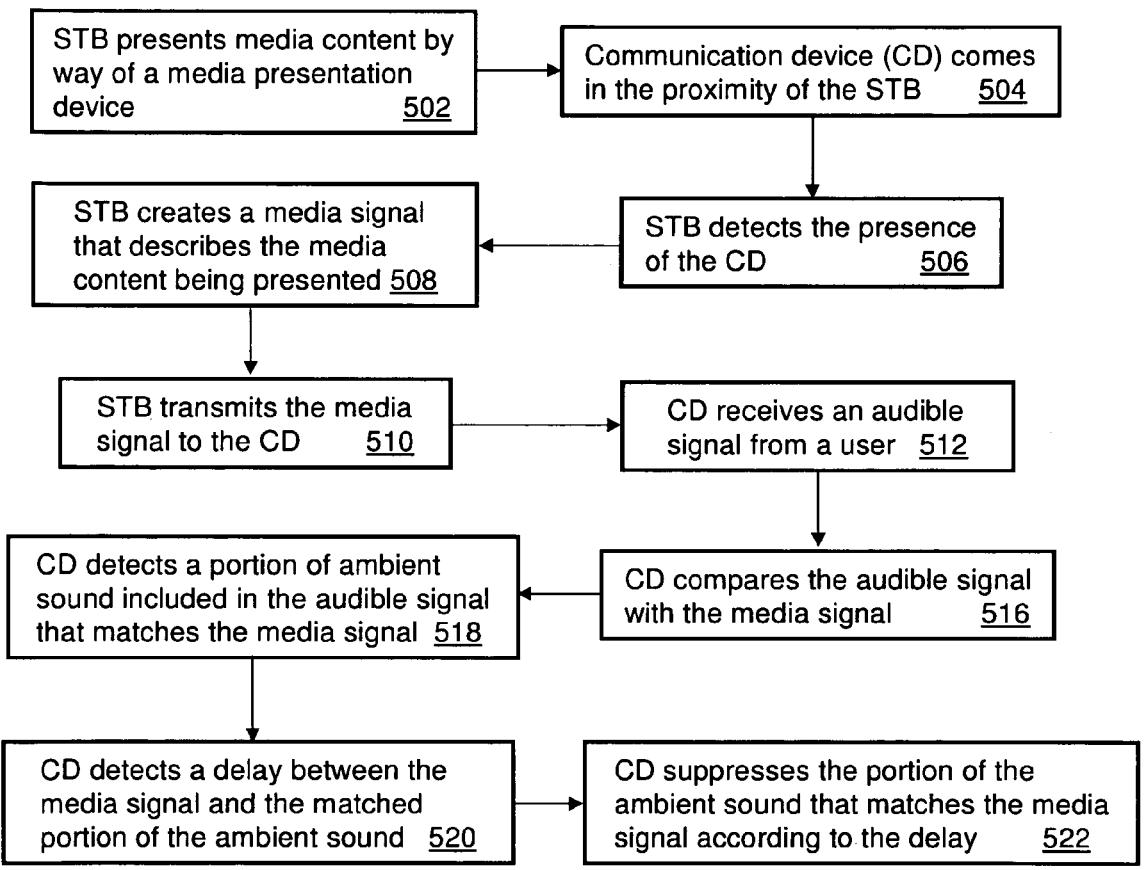
FIG. 5 depicts an illustrative embodiment of a method according to the present disclosure.
Figure 6:
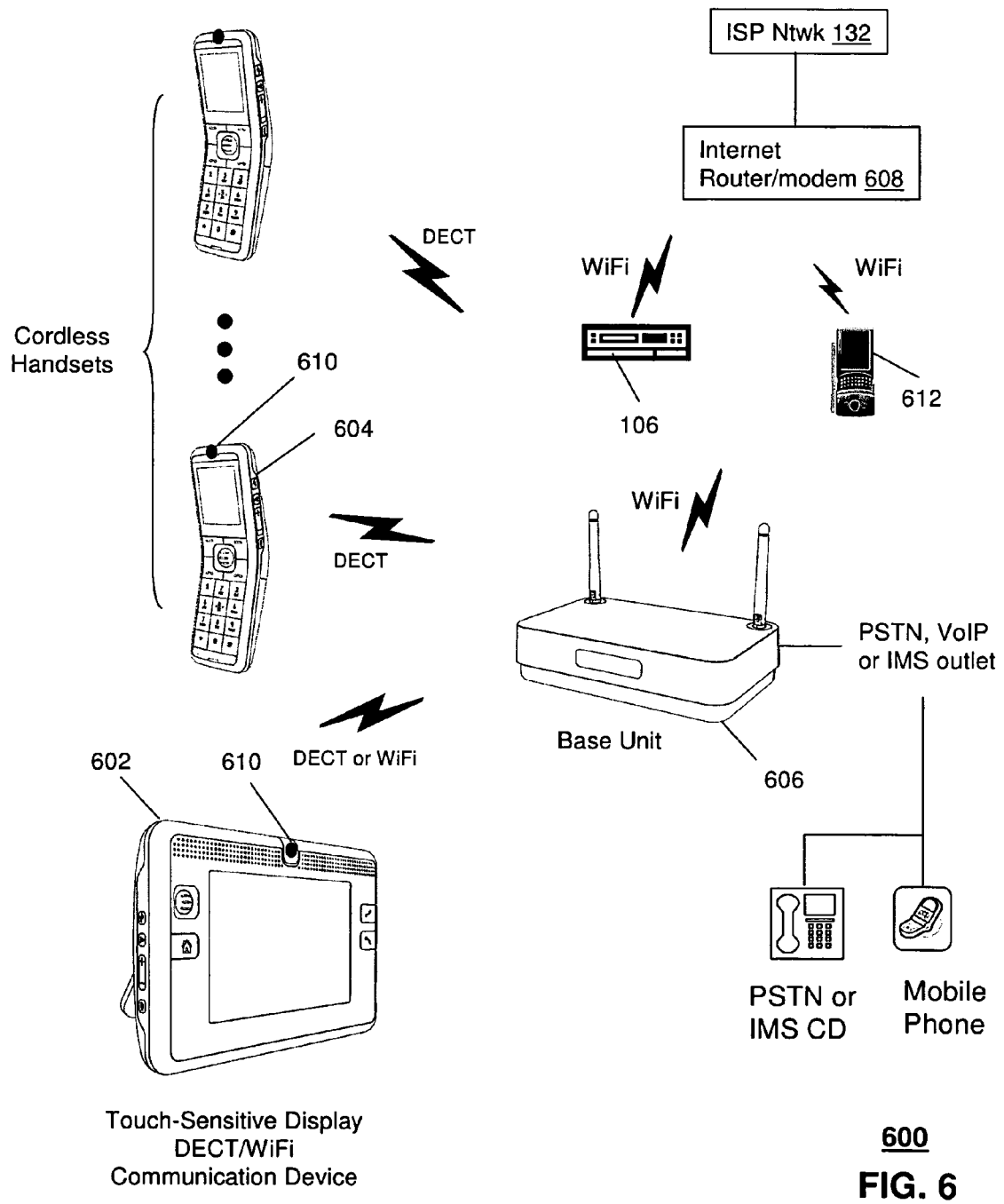
FIG. 6 depicts an illustrative embodiment of communication devices operating according to the method of FIG. 5.

FIG. 5 depicts an illustrative a method 500 operating in portions of the aforementioned communication systems. FIG. 6 shows an illustrative embodiment of communication devices operating according to method 500. Block diagram 600 comprises a landline communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the ISP network 132 of FIG. 1. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures.

A cellular phone 612 and an STB 106 each with WiFi capability can also be communicatively coupled to the WiFi network managed by the Internet router/modem 608. By way of the WiFi network, the STB 106, the cellular phone 612 and the base unit 606 can be communicatively coupled to each other. Similarly, the tablet 602 and the cordless phones 604 can be communicatively coupled to the STB 106 and the cellular phone 612 by way of the base unit 606. Accordingly, any of the communication devices illustrated in FIG. 7 can be communicatively coupled to each other by way of the Internet/Router modem 608 and or the base unit 606.

With the configuration of FIG. 6 in mind, method 500 can begin with step 502 in which a media processor such as the STB 106 of FIG. 1 presents media content by way of a media presentation device such as the TV 108 and/or an audio system such as a common surround-sound system coupled to the STB. The media content can represent audio-only content, or a combination of audio and video content. In step 504, a communication device such as the tablet 602, cordless handsets 604, or cellular phone 612 can come in proximity of the STB 106. The STB 106 can detect in step 506 the presence of the aforementioned communication devices in a number of ways.

In one embodiment, the STB 106 can detect the presence of the communication device while communicatively coupled to the WiFi network managed by the Internet Router/modem 608. In another embodiment, the STB 106 can detect the presence of the communication device by way of another air interface such as Bluetooth. In another embodiment, the STB 106 can detect the presence of the communication device by way of a wireline Ethernet connection (such as xDSL) shared by the STB and the communication device. In yet another embodiment, a user of the aforementioned communication devices can manipulate one or more functions in the UI of said devices to invoke a request which is transmitted to the STB 106 by way of the WiFi network.

The request can signal the STB 106 that there is a need to proactively assist the communication device in suppressing audible signals generated by the STB by way of the audio system coupled thereto. To accomplish this, the STB 106 can create a media signal in step 508 by common digital sampling techniques, and transmit the media signal in step 510 to the communication device. The media signal can be transmitted over a wireline (e.g., Ethernet wireline in the premises) or over a wireless interface (e.g., WiFi). The media signal can represent a digital signal that provides a spectral description of the audio portion of the media content being presented by the STB 106. The media signal can also provide a raw sampling or copy of the audio portion of the media content. It will be appreciated by an artisan of ordinary skill in the art that the media signal can be any signal that can provide the communication device a description of the audio portion of the media content presented by the STB 106 for purposes of suppression of a portion of ambient sound received by the communication device by way of an audio system such as reference 412 of FIG. 4.

While the communication device is receiving in step 512 an audio signal (by way of for example a microphone of the audio system 412), the audio signal comprising sound generated by a user of the communication device and other sources of sound in the vicinity of the user (e.g., the STB 106)—collectively ambient sound, the communication device can compare in step 516 the spectral aspects of the received audio signal to the spectral aspects of the media signal supplied by the STB 106. The communication device can use common comparison techniques such as correlation to detect a match between the spectral aspects of the audio signal received by the audio system 412 and the spectral aspects of the media signal supplied by the STB 106. In one embodiment, step 512 can represent for example a user of the tablet 602 engaged in voice communications while STB 106 is presenting a media program on a speaker system which can be heard by the audio system 412 of the tablet. The voice communications can be a low audio communication such as audio heard only in the proximity of a human ear, or high volume audio such as speakerphone for hands free operation.

From the comparison of the spectral characteristics of the media signal and the spectral characteristics of the audio signal as determined by the communication device, the communication device can detect a portion of ambient sound in the audio signal that matches the media signal. Suppose for instance that the STB 106 is presenting a movie with an audible component. The audio signal received by the audio system 412 of the communication device would include the audible component of the movie and the speech of the user. Steps 516-518 can represent a detection in the audio signal of the audible component of the movie.

In step 520, the communication device can also detect a consistent delay between the media signal and the matched portion of the detected ambient sound (in this illustration the audible component of the movie). With this information, and other potential spectral characteristics detected by the communication device by common spectral analysis techniques, the communication device can in step 522 suppress or filter out from the audio signal received in step 512 the portion of the ambient sound that matches the media signal.

Filtration can be accomplished with a common programmable hardware filter, or using common digital signal processing (DSP) techniques operating in the communication device. The DSP techniques can employ common software-controllable filters such as finite impulse response (FIR) filters, or infinite impulse response (IIR) filters which can operate from a DSP controller as mentioned earlier in the discussion regarding FIG. 4. Other filter techniques suitable to the present disclosure in the form of hardware, software, or combinations thereof are contemplated by the implementations of method 500. Step 522 can be consistently applied to the audio signal received in step 512 according to the delay detected in step 520, thereby continuously suppressing unwanted ambient sound cause by the STB 106.

Method 500 provides one of a number of possible embodiments to suppress ambient sound which can be considered by users of the communication devices to be noise or undesired sound. Method 500 can also be viewed by some users to provide a sense of privacy by suppressing background sound that the users may not want others to hear.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that it can be applied to communication devices in remote locations outside of the premises where the STB 106 is located. Accordingly, the communication device and the STB 106 do not have to be co-located in the same premises. In this embodiment, a communication device can be communicatively coupled to the STB 106 over the ISP network 132, or the base unit 606 over the WiFi network managed by the Internet router/modem 608. The STB 106 can provide over a data channel for example the media signal to a remote communication device to suppress an audible component of media content presented by the STB 106 as was described for method 500.

In another embodiment, the base unit 606 can be programmed to perform some of the functions described for method 500. This embodiment can be useful in instances where the communication device communicatively coupled to the base unit 606 does not have the processing resources necessary to perform spectral analysis as described above. In yet another embodiment, method 500 can be adapted to operate in other communication devices such as a computer or common headsets (such as Bluetooth headsets). Method 500 can also be extended to any media processing device that can generate an audible presentation. Common media processors can include computers, gaming consoles, MP3 players, and so on. Any of these devices can be programmed to provide a media signal to a communication device in a manner similar to the descriptions above for method 500.

In another embodiment, method 500 can be adapted so that multiple media processors generating audible signals by way of media presentation devices such as amplifier/speaker systems (each causing ambient sound) can be programmed to supply corresponding media signals associated with these presentations to a communication device. In this embodiment, the communication device can suppress ambient sound from a multiplicity of audio sources each supplying a media signal to the communication device to enable the suppression process.

Other suitable modifications can be applied to the present disclosure without departing from the scope of the claims below. Accordingly, the reader is directed to the claims section for a fuller understanding of the breadth and scope of the present disclosure.

Figure 7:
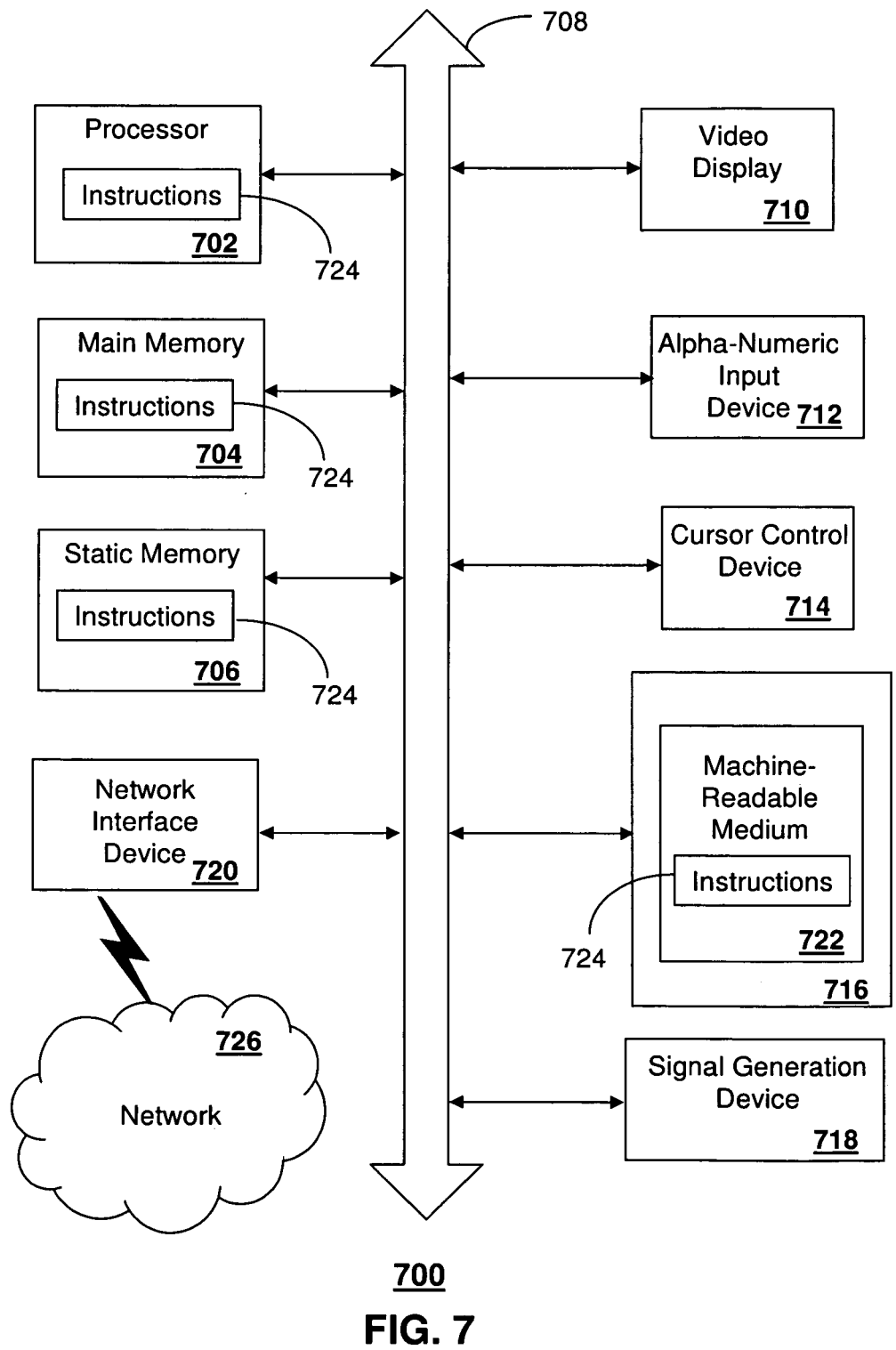
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An end user voice communication device, comprising:
a memory to store computer instructions; and
a controller coupled with the memory, wherein the controller is integrated with a landline phone, wherein the landline phone corresponds to a cordless phone communicatively coupleable to a base unit by way of a cordless phone protocol and a wireless data protocol, wherein the cordless phone protocol corresponds to a digital enhanced cordless telecommunications protocol, and wherein the wireless data protocol corresponds to a wireless fidelity protocol, and wherein the controller, responsive to executing the computer instructions, performs operations comprising:
enabling a voice communication session with another end user voice communication device, wherein the voice communication session is established without routing the session through a set-top box;
receiving a media program signal from the set-top box, the media program signal comprising a sampling of a media program presentable at least audibly by the set-top box, wherein the media program signal corresponds to digital signals representing the sampling of the media program;
monitoring ambient sound that includes first and second portions, wherein the first portion corresponds to audio content of the media program being emitted by a display device coupled with the set top box, wherein the second portion is being emitted from a source other than the display device, wherein the media program corresponds to the audio content combined with video content;
comparing the sampling with the ambient sound to generate a comparison of the sampling and the ambient sound that identifies a match between the media program signal and the ambient sound;
detecting a delay between the media program signal and a matched portion of the ambient sound based on the comparison;
detecting the first portion of the ambient sound that matches the media program signal by correlation;
suppressing the first portion of the ambient sound based on the comparison of the sampling with the ambient sound during the voice communication session and based on the detecting of the delay, wherein the suppressing is performed utilizing a filter;
suppressing the second portion of the ambient sound during the voice communication session;
comparing spectral aspects of the monitored ambient sound to spectral aspects of the media program signal;

suppressing the spectral aspects of the portion of the ambient sound that matches spectral aspects of the media program signal.

2. The end user voice communication device of claim 1, wherein the controller continues to receive the media program signal throughout the voice communication session.

3. The end user voice communication device of claim 2, wherein the communication device is communicatively couplable to the set-top box by way of a gateway operating according to the wireless data protocol.

4. The end user voice communication device of claim 1, wherein the communication device is in communication with an internet protocol multimedia subsystem communication system.

5. An end user voice communication device, comprising:
a memory to store computer instructions; and
a controller coupled with the memory, wherein the controller is integrated with a landline phone, wherein the landline phone corresponds to a cordless phone communicatively coupleable to a base unit by way of a cordless phone protocol and a wireless data protocol, wherein the cordless phone protocol corresponds to a digital enhanced cordless telecommunications protocol, and wherein the wireless data protocol corresponds to a wireless fidelity protocol, and wherein the controller, responsive to executing the computer instructions, performs operations comprising:
enabling a voice communication session with another end user voice communication device, wherein the voice communication session is established without routing the session through a set-top box;
receiving a media program signal from the set-top box, the media program signal comprising a sampling of a media program presentable at least audibly by the set-top box, wherein the media program signal corresponds to digital signals representing the sampling of the media program;
monitoring ambient sound that includes first and second portions, wherein the first portion corresponds to audio content of the media program being emitted by a display device coupled with the set top box, wherein the second portion is being emitted from a source other than the display device, wherein the media program corresponds to the audio content combined with video content;
comparing the sampling with the ambient sound to generate a comparison of the sampling and the ambient sound that identifies a match between the media program signal and the ambient sound;
detecting a delay between the media program signal and a matched portion of the ambient sound based on the comparison;
detecting the first portion of the ambient sound that matches the media program signal by correlation;
suppressing the first portion of the ambient sound based on the comparison of the sampling with the ambient sound during the voice communication session and based on the detecting of the delay, wherein the suppressing is performed utilizing a filter;
suppressing the second portion of the ambient sound during the voice communication session;
comparing spectral aspects of the monitored ambient sound to spectral aspects of the media program signal;
suppressing the spectral aspects of the portion of the ambient sound that matches spectral aspects of the media program signal, wherein the base unit is an integral part of the set-top box.

6. A non-transitory computer-readable storage medium, comprising computer instructions which, when executed by a processor of an end user voice communication device, cause the processor to perform operations comprising:
enabling a voice communication session with another end user voice communication device, wherein the voice communication session is established without routing the session through a set-top box;
receiving a media program signal from the set-top box, the media program signal comprising a sampling of a media program presentable at least audibly by the set-top box, wherein the media program signal corresponds to digital signals representing the sampling of the media program;
monitoring ambient sound that includes first and second portions, wherein the first portion corresponds to audio content of the media program being emitted by a display device coupled with the set top box, wherein the second portion is being emitted from a source other than the display device, wherein the media program corresponds to the audio content combined with video content;
comparing the sampling with the ambient sound to generate a comparison of the sampling and the ambient sound that identifies a match between the media program signal and the ambient sound;
detecting a delay between the media program signal and a matched portion of the ambient sound based on the comparison;
detecting the first portion of the ambient sound that matches the media program signal by correlation;
suppressing the first portion of the ambient sound based on the comparison of the sampling with the ambient sound during the voice communication session and based on the detecting of the delay, wherein the suppressing is performed utilizing a filter;
suppressing the second portion of the ambient sound during the voice communication session;
comparing spectral aspects of the monitored ambient sound to spectral aspects of the media program signal; and
suppressing the spectral aspects of the portion of the ambient sound that matches spectral aspects of the media program signal,
wherein the processor is integrated with a landline phone, wherein the landline phone corresponds to a cordless phone communicatively coupleable to a base unit by way of a cordless phone protocol and a wireless data protocol, wherein the cordless phone protocol corresponds to a digital enhanced cordless telecommunications protocol, and wherein the wireless data protocol corresponds to a wireless fidelity protocol.

7. A method, comprising:
enabling, by a controller of an end user voice communication device, a voice communication session with another end user voice communication device, wherein the voice communication session is established without routing the session through a set-top box, wherein the controller is integrated with a landline phone, wherein the landline phone corresponds to a cordless phone communicatively coupleable to a base unit by way of a cordless phone protocol and a wireless data protocol, wherein the cordless phone protocol corresponds to a digital enhanced cordless telecommunications protocol, and wherein the wireless data protocol corresponds to a wireless fidelity protocol;
receiving, by the controller, a media program signal from the set-top box, the media program signal comprising a sampling of a media program presentable at least audibly by the set-top box, wherein the media program signal corresponds to digital signals representing the sampling of the media program;

monitoring, by the controller, ambient sound that includes first and second portions, wherein the first portion corresponds to audio content of the media program being emitted by a display device coupled with the set top box, wherein the second portion is being emitted from a source other than the display device, wherein the media program corresponds to the audio content combined with video content;

comparing, by the controller, the sampling with the ambient sound to generate a comparison of the sampling and the ambient sound that identifies a match between the media program signal and the ambient sound;

detecting, by the controller, a delay between the media program signal and a matched portion of the ambient sound based on the comparison;

detecting, by the controller, the first portion of the ambient sound that matches the media program signal by correlation;

suppressing, by the controller, the first portion of the ambient sound based on the comparison of the sampling with the ambient sound during the voice communication session and based on the detecting of the delay, wherein the suppressing is performed utilizing a filter;

suppressing, by the controller, the second portion of the ambient sound during the voice communication session;

comparing, by the controller, spectral aspects of the monitored ambient sound to spectral aspects of the media program signal; and suppressing, by the controller, the spectral aspects of the portion of the ambient sound that matches spectral aspects of the media program signal.

* * * * *